March 17, 1964 D. EKLOV 3,125,648

AUTOMATICALLY CONTROLLED TWO-WAY AMPLIFIER

Filed July 15, 1960 8 Sheets-Sheet 1

INVENTOR
DAVID EKLOV

BY Strauch, Nolan & Neale

ATTORNEYS

INVENTOR
David Eklov

BY Strauch, Nolan & Neale
ATTORNEYS

March 17, 1964 D. EKLOV 3,125,648

AUTOMATICALLY CONTROLLED TWO-WAY AMPLIFIER

Filed July 15, 1960 8 Sheets-Sheet 3

INVENTOR
DAVID EKLOV

BY Strauch, Nolan & Neale
ATTORNEYS

March 17, 1964 D. EKLOV 3,125,648

AUTOMATICALLY CONTROLLED TWO-WAY AMPLIFIER

Filed July 15, 1960 8 Sheets-Sheet 4

INVENTOR

DAVID EKLOV

BY Strauch, Nolan & Neale

ATTORNEYS

INVENTOR.
David Eklov
BY
Strauch, Nolan & Neale
ATTORNEYS

March 17, 1964 D. EKLOV 3,125,648

AUTOMATICALLY CONTROLLED TWO-WAY AMPLIFIER

Filed July 15, 1960 8 Sheets-Sheet 6

INVENTOR.
DAVID EKLOV

BY Strauch, Nolan + Neale
ATTORNEYS

March 17, 1964 D. EKLOV 3,125,648

AUTOMATICALLY CONTROLLED TWO-WAY AMPLIFIER

Filed July 15, 1960 8 Sheets-Sheet 7

INVENTOR.
DAVID EKLOV

BY

Strauch, Nolan & Neale

ATTORNEYS

March 17, 1964 D. EKLOV 3,125,648

AUTOMATICALLY CONTROLLED TWO-WAY AMPLIFIER

Filed July 15, 1960 8 Sheets-Sheet 8

INVENTOR

DAVID EKLOV

BY Strauch, Nolan + Neale

ATTORNEYS

United States Patent Office
3,125,648
Patented Mar. 17, 1964

3,125,648

AUTOMATICALLY CONTROLLED TWO-WAY AMPLIFIER

David Eklov, Alvsjo, Sweden, assignor to Svenska Relafabriken Abn Ab, Tyreso, Sweden, a corporation of Sweden Filed July 15, 1960, Ser. No. 43,175
Claims priority, application Sweden Feb. 24, 1954
25 Claims. (Cl. 179—170.2)

The present invention relates to an automatically controlled two-way amplifier for speech transmission in two directions, and more particularly for telephone systems having loudspeaking telephones at one or more subscribers' stations.

This application is a continuation-in-part of my copending application Serial No. 785,528, filed January 7, 1959, now abandoned, which is a continuation-in-part of my applications: Serial No. 490,318, filed February 24, 1955, now abandoned; Serial No. 705,382, filed December 26, 1957, now U.S. Patent No. 3,027,429; Serial No. 705,359, filed December 26, 1957, now U.S. Patent No. 3,027,428; Serial No. 705,314, filed December 26, 1957, now U.S. Patent No. 3,015,781; and Serial No. 705,283, filed December 26, 1957, now abandoned.

It is previously known in systems of the foregoing type to use two-way amplifiers having one amplifier unit for each direction of transmission. In ordinary telephone systems equipped with the usual handsets, acoustic feedback and oscillations caused thereby can be simply prevented by means of a conventional antiside-tone circuit, but in systems having loudspeaking telephones, as well as intercommunication systems, it has proved nearly impossible to achieve the desired result by means of such simple expedients. This is because in the latter case factors such as the variable impedance of loudspeaker and reverberation due to room acoustics become effective in a very high degree and cannot easily be neutralized.

It has previously been proposed to provide the amplifiers for the two directions of transmission with means for varying the gain, and to derive from the transmitted speech currents control voltages which cause an increase of the gain in the amplifier unit included in the outgoing transmission path and a complete reduction of the gain or a blocking or immobilization of the other amplifier unit. However, it has proved difficult to make such automatically controlled two-way amplifiers work satisfactorily for carrying on conversations without loss of the first syllables of the words, particularly after a pause in the speech. Usually the control voltage is taken from the output tubes of the two-way amplifier, that is at a point in the amplifier unit after the controlled amplifier stage. A certain initial gain must then be present in both directions of transmission in order that required control voltage can be produced in response to speech current from either one of the connected microphones.

It is, accordingly, a major object of the present invention to provide a novel method and circuit arrangement for providing a control voltage which increases the gain of the amplifier unit containing the desired speech signals and decreases the gain of the other amplifier circuit so that the maximum combined gain of the amplifier units in the two-way amplifier unit never exceeds a magnitude that causes oscillations which are characterized by squealing or howling.

For practical reasons it is highly desirable that the initial gain is high. Often the person to whom a call is directed, is at a rather large distance from his microphone, and in order that it nevertheless shall be possible when replying to obtain at least some increase of the gain in the direction from the called party to the calling party, the initial gain must, of course, not be too slight. On the other hand the initial gain must not be so high that the total gain in the closed circuit formed by the two amplifier units and the acoustic paths between loudspeaker and microphone exceeds unity, since in such case oscillations would be produced. Thus it is desirable that the initial combined gain of the amplifier units in the two-way amplifier is so chosen that it is as near its maximum permissible value as possible.

It is another major object of the present invention to provide a novel automatically controlled two-way amplifier wherein the gain-increase characteristics of one amplifier unit are keyed to the gain-decrease characteristics of the other amplifier whereby the inactive amplifier unit is never completely cut off and the active amplifier unit gain is limited to a value which never permits the combined gains of the two amplifier units to exceed a maximum safe value.

An especially advantageous embodiment of the invention is obtained if the arrangements are so designed that the difference between the numerical value of the gain in the amplifier stage in which the gain is increased, and the numerical value of the gain in the amplifier stage in which the gain is reduced, measured in decibels with the initial gain as reference level is made as nearly constant as is possible during the larger part of the control process or possibly somewhat increasing, so that the combined gain of the amplifier units is maintained substantially constant or decreases somewhat with increasing amplitude of the speech currents producing the control voltages.

Another object of the invention is to provide a two-way amplifier having novel gain control circuits operative in response to speech currents in the active amplifier to produce an increase in the gain of the active amplifier which is always less than the reduction of gain in the inactive amplifier. This principle of gain control permits a comparatively high initial gain in both amplifiers, and the microphone and the loudspeaker can be assembled in a single physical unit without causing howling and singing.

A further object of the invention is to provide a novel two-way amplifier wherein the control action causing reduction of gain never causes a complete immobilization of any of the amplifier units which results in any appreciable delay before the amplifier may become active whereby the interconnected subscribers of a telephone can conduct their conversation with a minimum of speech clipping.

A still further object of the present invention is to provide a novel control circuit in each of the two amplifier units which has a first branch and a second branch, the first branch being connected to an amplifying stage having variable gain in one amplifier unit, the second branch being connected to an amplifying stage having variable gain in the other amplifier unit, said first branch including means for deriving a first control voltage from the signal current in said one amplifier unit when the strength of said signal currents exceeds a first threshold value, said second branch including means for deriving a second control voltage from the signal currents in said one amplifier unit when the strength of said signal currents exceeds a second threshold value which is lower than said first threshold value, for providing different control voltages for each amplified unit, and limiting devices to thereby cause the gain in the two amplifiers to become substantially constant when the applied signal voltage exceeds a certain value and to reduce distortions of signals amplified in the amplifier units.

Hitherto, great difficulties have been encountered in supplying direct current to amplifiers housed in telephone apparatuses over the line to which the telephone apparatus is connected, since the various subscribers' lines in a telephone network have a highly varying length and hence offer different resistances, so that the voltage applied to the amplifiers in the telephone apparatus is sometimes insufficient while in other cases it may be too high. Moreover, it must be seen to that the conductors of the subscribers' lines are connected with the correct polarity to the telephone apparatus which entails extra difficulties in the installation of the apparatus. If the amplifiers in the telephone apparatus contain transistors it is of great importance that the direct current supplied to the amplifiers does not assume a too high value or the wrong polarity, since in such case the amplifiers are not only made inoperative but are also damaged.

It is thus a further object of the present invention to provide a telephone apparatus of the kind defined having means for permitting the apparatus to be connected to subscribers' lines the D.C. voltage of which may vary within the wide limits.

A further object of the invention is to provide a telephone apparatus of the kind defined having means for storing energy during intervals of low excitation of the amplifiers and delivering additional energy to the amplifiers during intervals of high excitation of the amplifiers.

A still further object of the invention is to provide a telephone apparatus of the kind defined, the amplifiers of which receive operating D.C. voltage from the line of correct polarity irrespective of the polarity of the D.C. voltage between the conductors of the line.

Another object resides in the provision of a novel circuit arrangement for protecting transistors against high magnitude transient voltages arising in the telephone line which does not otherwise interfere with the normal operation of the loudspeaking telephone circuit.

These and other objects of the invention will become more fully apparent from the claims, and from the description as it proceeds in connection with the appended drawings, in which:

Figure 4A:
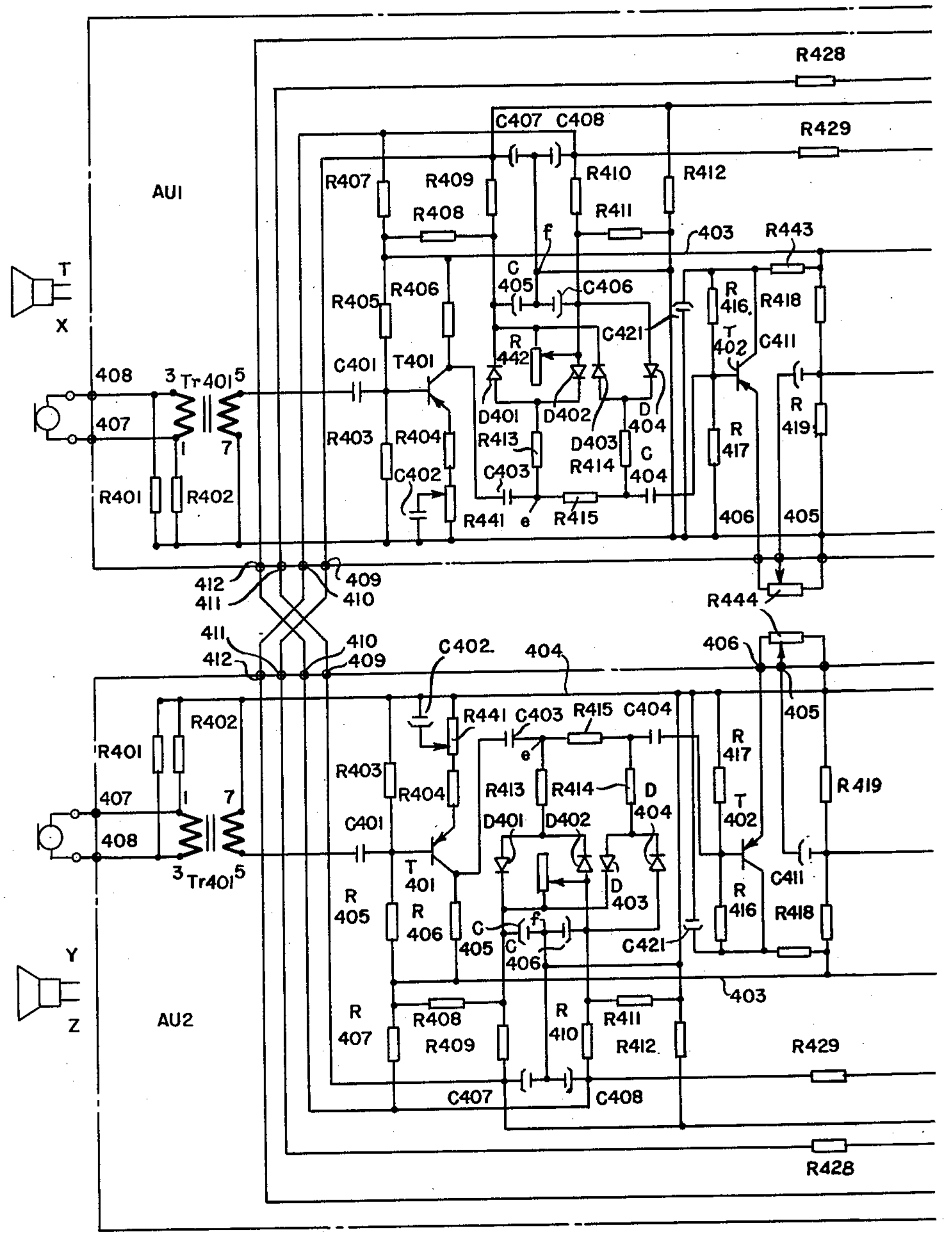
Figure 4B:
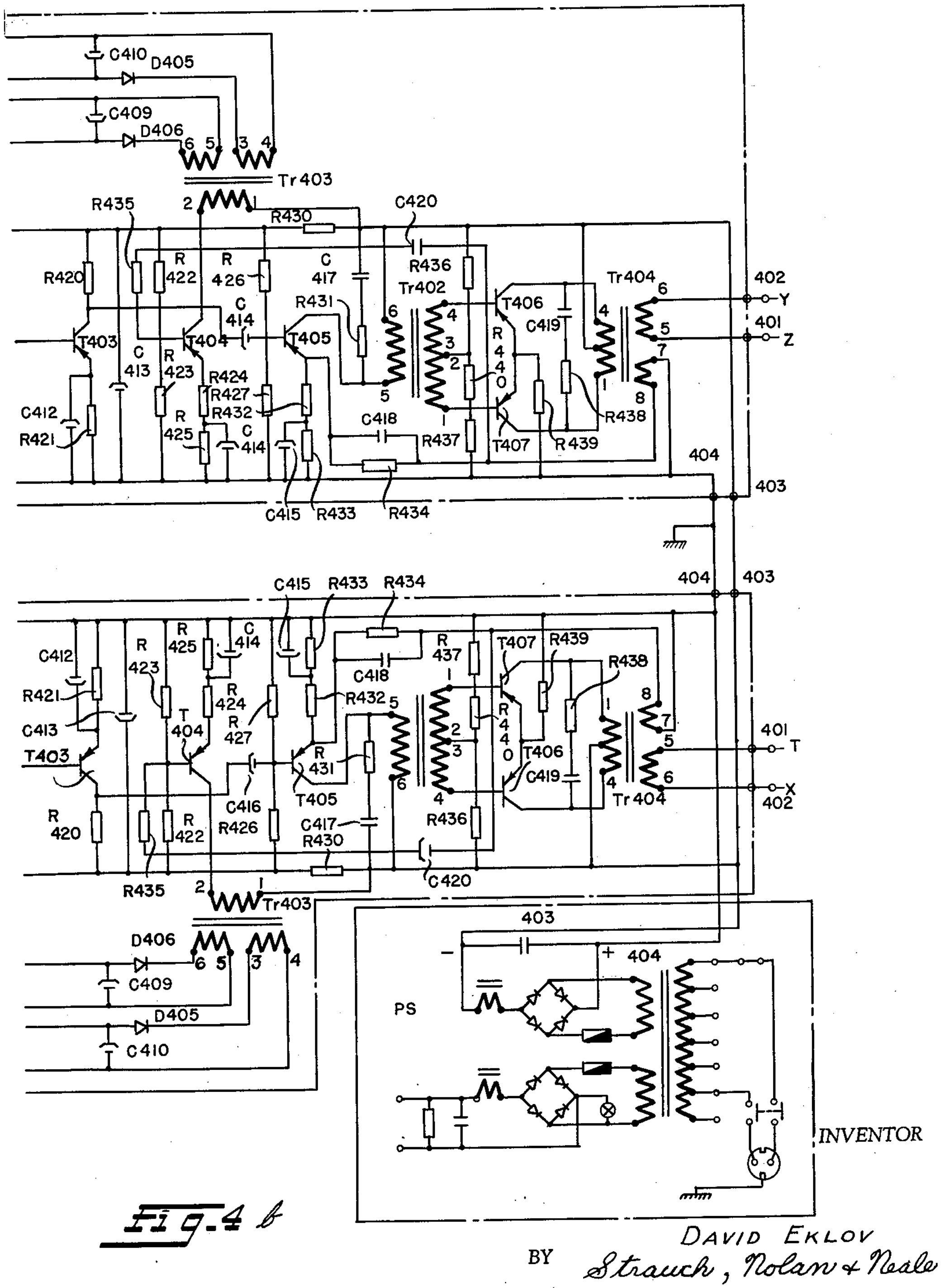
Figure 5:
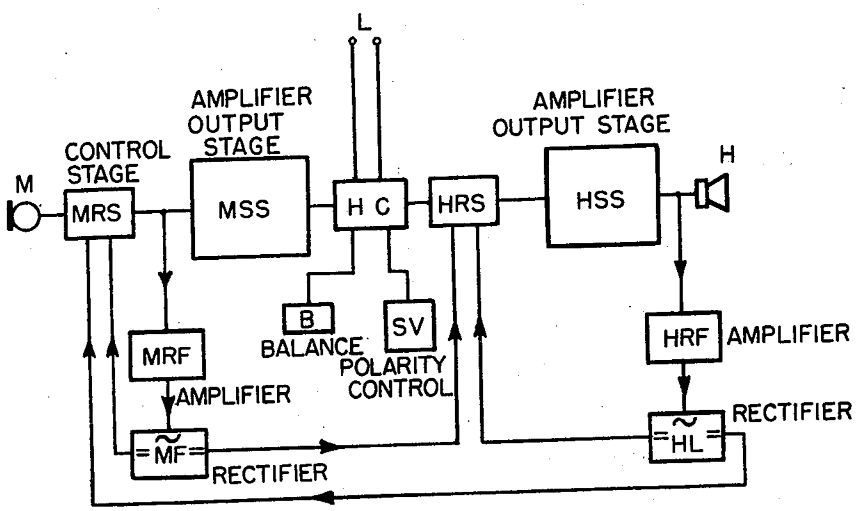
Figure 6:
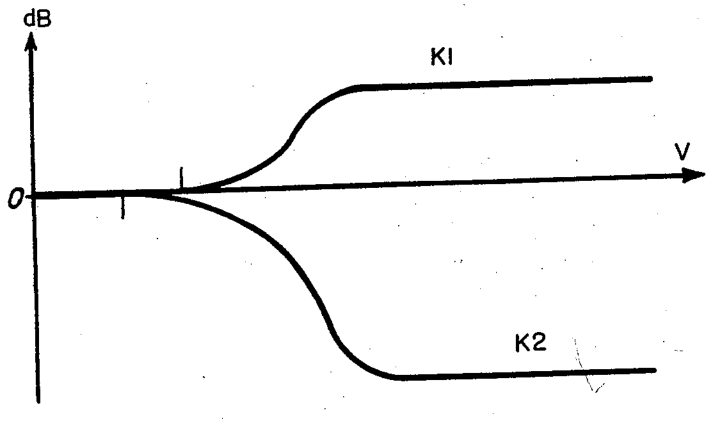
Figure 7A:
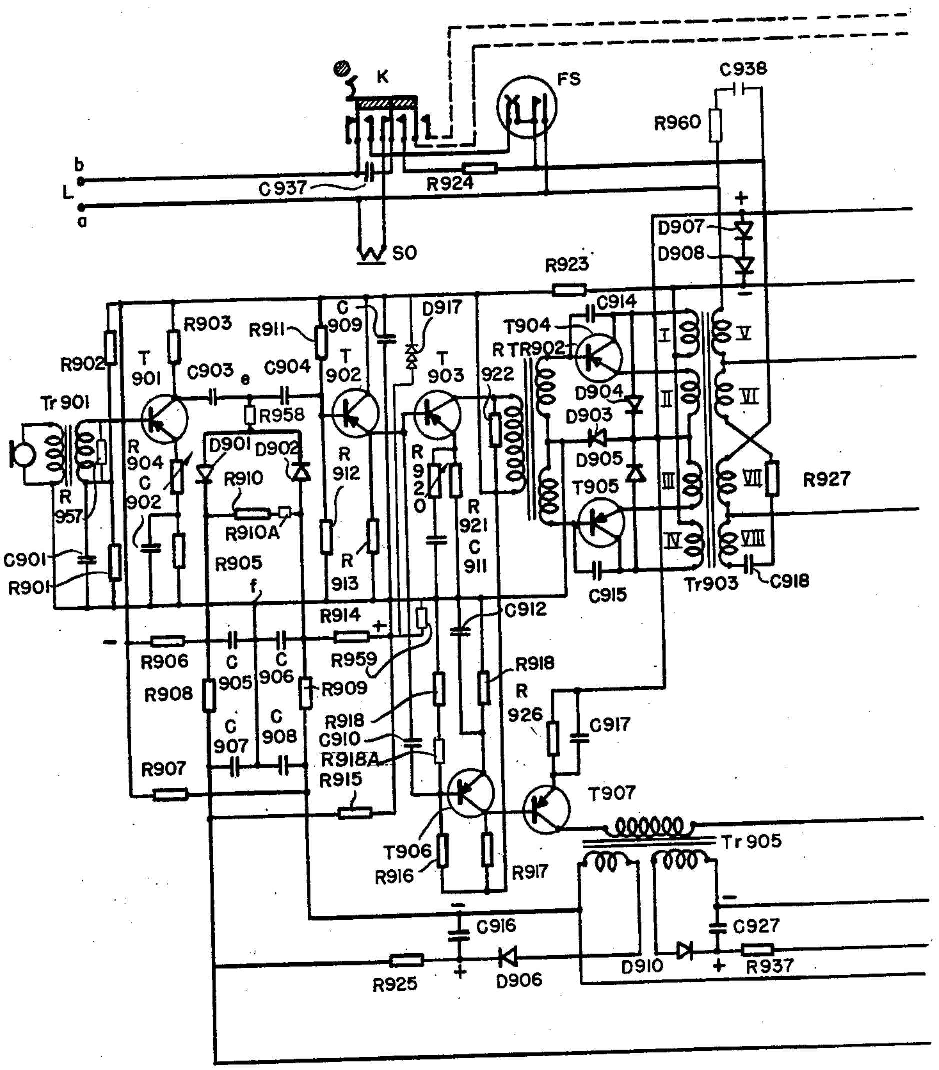
Figure 7B:
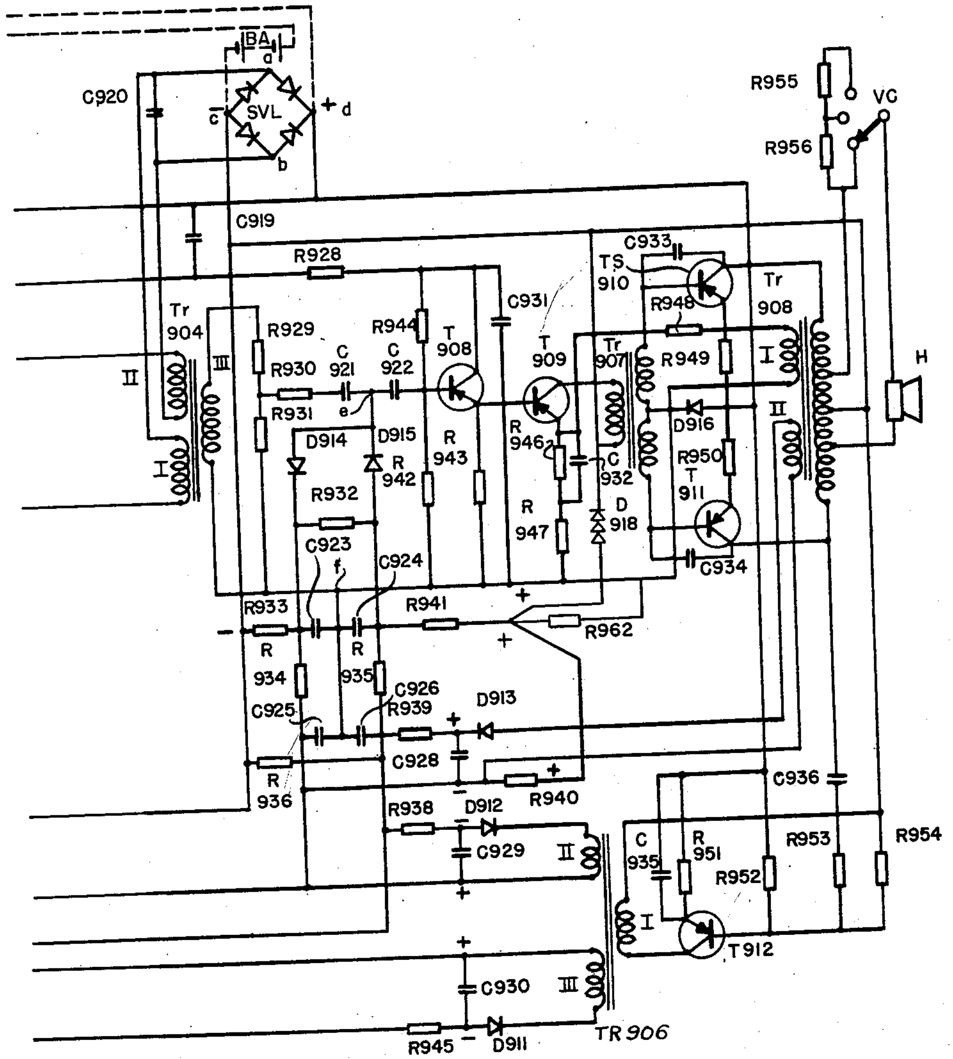
Figure 8:
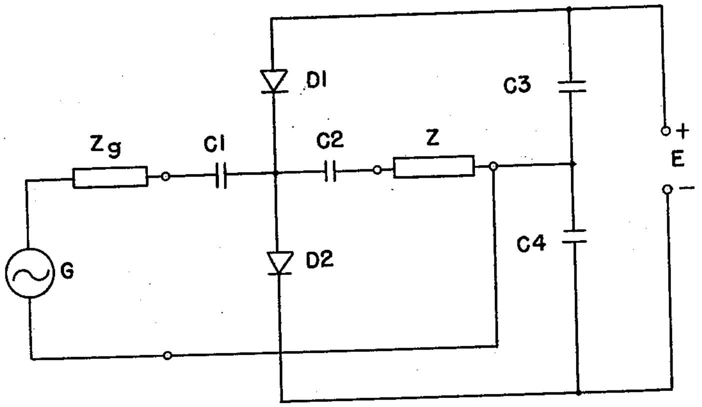
Figure 9:
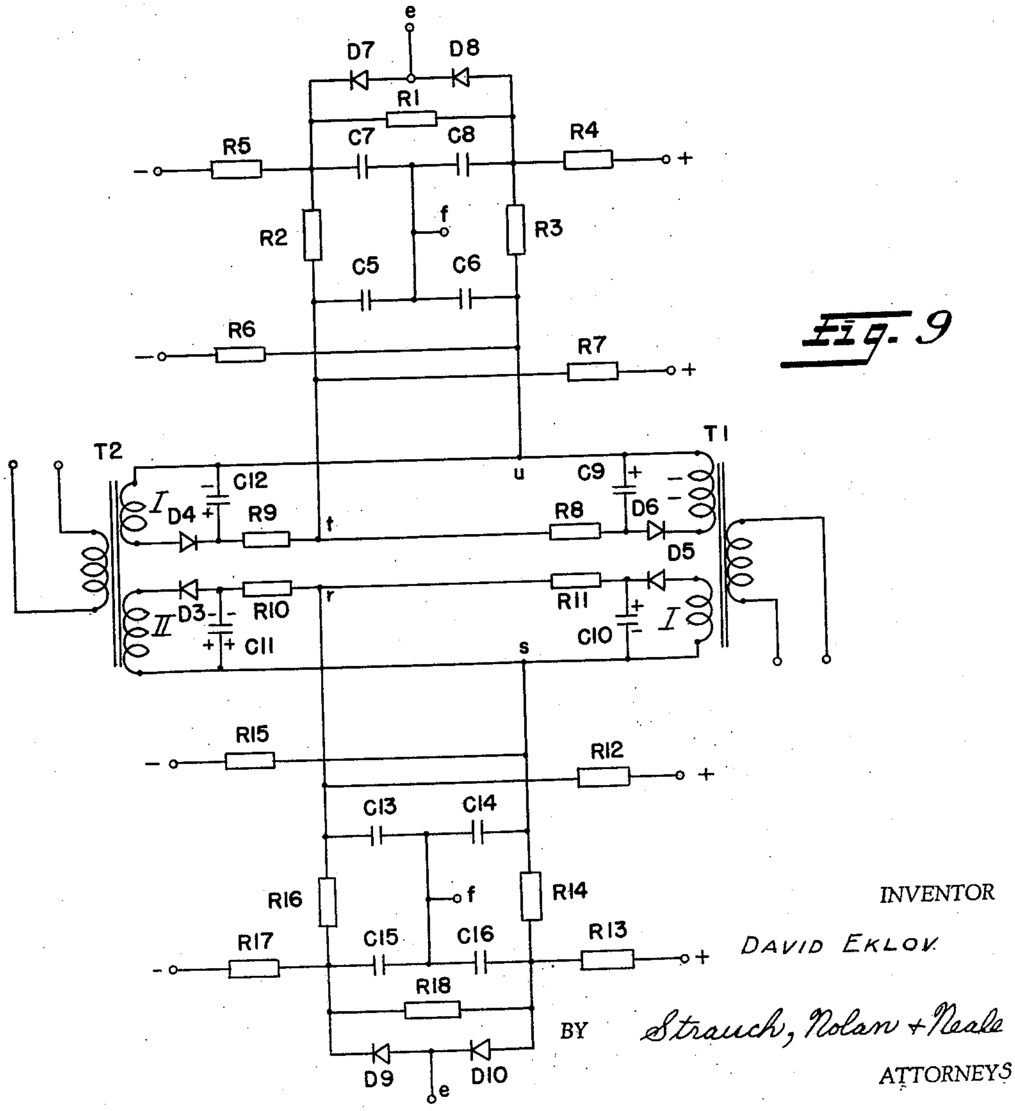

FIGURES 4*a* and 4*b* together comprise a detailed circuit diagram of a transistorized embodiment of the two-way amplifier according to the present invention;

FIGURE 5 is a block diagram of a loudspeaking telephone instrument containing a transistorized two-way amplifier embodying the present invention;

FIGURE 6 is a diagram illustrating the gain control characteristics of the two-way amplifier utilized in the loudspeaking telephone instrument illustrated in FIGURE 5;

FIGURES 7*a* and 7*b* together comprise a detailed circuit diagram of a loudspeaking telephone instrument of FIGURE 5 containing a two-way amplifier utilizing transistors powered from the input wires from telephone exchange;

FIGURE 8 is a block diagram of the control circuit used in the embodiments of this invention shown in FIGURES 4 and 7; and FIGURE 9 is a circuit diagram of just the control circuit from the loudspeaking telephone of FIGURE 7.

In the figures, the various circuit components are designated by letters followed by numerals. Different types of components are designated by different letters as follows:

C—capacitors
D—rectifier diodes
H—loudspeakers
M—microphones

R—resistors
T—transistors
T*r*—transformers
V—electron tubes

The two-way amplifier according to FIGURE 1 consists of two amplifier units which are identically alike and are designated AU1 and AU2, amplifier unit AU1 being shown above and amplifier unit AU2 below the common grounded conductor G in the figure. The two amplifier units have some components in common, viz. resistors R35 to R41 and capacitors C23 to C25. For the other components the reference numerals have been so chosen that all odd numbers designate the components of amplifier unit AU1 and the subsequent even numbers designate the corresponding components of the amplifier unit AU2.

The amplifier units are connected to a common direct current power source which may be of any conventional type but is not shown in the figure. The connections to the positive and negative pole of the power source are indicated by plus and minus signs respectively in the figure.

Figure 1:
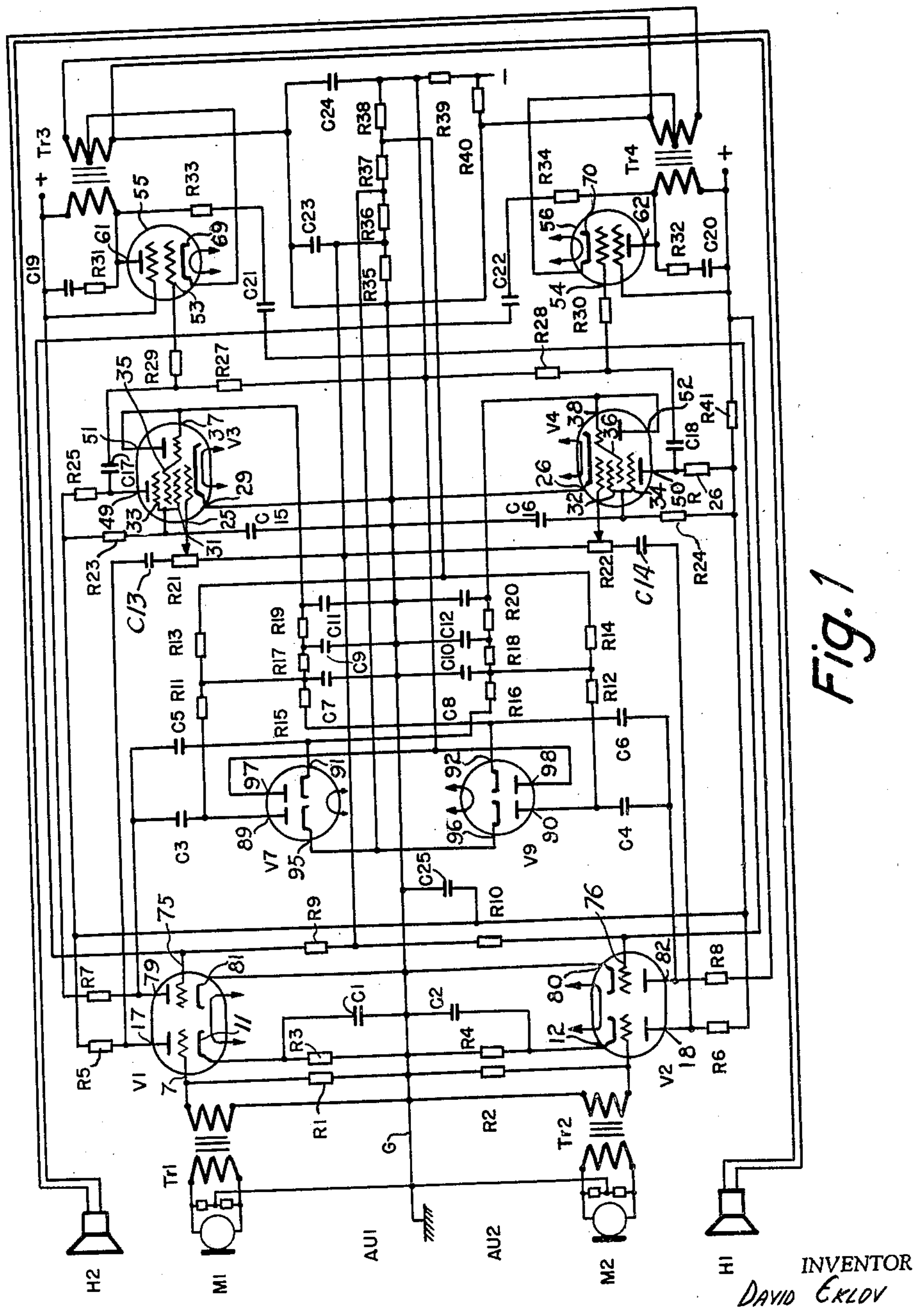
FIGURE 1 is a circuit diagram of one embodiment of a two-way amplifier according to the present invention.

The amplifier units are operative in one direction of transmission each which has been indicated in FIGURE 1 by the microphone M1 of amplifier unit AU1 being placed at the side of the loudspeaker H2 of amplifier unit AU2 and the microphone M2 of the latter amplifier unit being placed at the side of loudspeaker H1 of amplifier unit AU1.

In the following description of the amplifier units reference will be made chiefly to amplifier unit AU1, but it will be understood that the same description applies equally well to amplifier unit AU2, because the two amplifier units are identically alike.

The microphone M1 of amplifier unit AU1 is connected to the primary winding of an input transformer T*r*1, the connecting circuit being balanced in known manner with respect to ground. The secondary winding of input transformer T*r*1 has one terminal connected to ground and the other terminal connected to the control grid 7 in one triode section of a twin triode V1. The cathode 11 of this triode section is connected to ground through a resistor R3 connected in parallel with a capacitor C1 in order that the grid shall receive the required negative bias. The anode 17 of this triode section is supplied with positive voltage through an anode resistor R5. This triode section works as an ordinary amplifier stage with resistance coupling, and the alternating voltage developed across the anode resistor R5 is applied through a capacitor C13 and a potentiometer R21 to a control grid 25 in the hexode section of a triode-hexode V3. This tube serves as a control tube and effects the actual gain control. The cathode 29 is directly connected to ground, and control grid 25 of the hexode section receives its negative bias by the grid potentiometer R21 being connected to a tap on a voltage divider for supplying fixed biases and reference potentials, the voltage divider being common to the two amplifier units and consisting of the resistors R35, R36, R37, R38, R39 and R40 and the filter capacitors C23 and C24. The grid potentiometer R21 is connected to the tap between resistors R35 and R36, and its potential with respect to ground is for example −2 volts.

The screen grid of the hexode tube V3 consists of a double grid 31 and 33 connected through a resistor R23 to an anode voltage which is thoroughly smoothed by resistor R41 and capacitor C25. Furthermore, the double grid 31—33 is decoupled to ground through a capacitor C15. Between grids 31 and 33 there is a second control grid 35 which is connected to the control grid 37 of the triode section. Thus the hexode section can be controlled in two ways, viz, by the signal voltage applied to the grid 25 and by the control voltage applied to grid 35 over grid 37 of the triode section. A change of the voltage on grid 37 of the triode section causes a change in the amplification of the signals which are applied to the control grid 25 of the hexode section. This is due to the fact that the voltage variation on the control grid 37 changes the screen grid current through resistor R23 and thereby causes a variation of voltage on screen grids 31, 33. This variable screen grid voltage yields a very smooth and continuous gain regulation.

The control grid 37 is connected through resistors R19, R17 and R13 to a point between resistors R37 and R38 of the voltage divider supplying fixed bias and reference voltages which point has a potential of for example −5 volts. Hereby the gain in the control tube V3 is kept at a relatively low level representing the initial gain. The anode alternating voltage is passed through capacitor C17 and applied to control grid 53 of output tube V5. The negative control grid bias for this tube is supplied via resistors R29 and R27 from the tap between resistors R38 and R39 of the voltage divider and amounts to for example −7 volts. The anode of the output tube receives its positive voltage through the primary of output transformer T*r*3 which is bridged by a filter consisting of resistor R31 and capacitor C19. The purpose of this filter is to keep the anode load impedance approximately constant even at high frequencies. The cathode 69 of the output tube is connected to a tap on the secondary of output transformer T*r*3, one terminal of the secondary being connected to ground. Hereby a certain negative feedback is obtained which favorably influences the frequency response and the stability of the amplifier. A loudspeaker H1 is also connected to the secondary of the output transformer.

The required alternating voltage for the gain control of the amplifier units is taken from the anodes of the respective output tubes of the amplifier units. In amplifier unit AU1 this alternating voltage is taken from the anode 61 of output tube V5 over resistor R33 and capacitor C21 and is applied to grid 76 in the second triode section of the twin triode V2 of the other amplifier unit AU2 in which it is further amplified. Thus the amplification does not take place in the corresponding triode section in its own amplifier unit, and therefore trouble due to eventual coupling between the triode sections in the same tube is avoided.

The control grid 76 receives negative bias through resistor R10 which is connected to a tap between resistors R35 and R36 in the common voltage divider. This bias is, as mentioned previously, for instance −2 volts. Cathode 80 is directly connected to ground, and anode 82 is supplied with positive voltage via anode resistor R8.

The amplified control voltage is taken from anode 82 over capacitors C4 and C6 and is applied to anode 90 of one diode section and to cathode 92 of the other section of the twin diode V9. Cathode 96 of one diode is connected to the voltage divider at a point between resistors R36 and R37, said point having a potential of for example −4 volts, while anode 90 of the same diode is connected through resistors R12 and R14 to the same voltage divider at a point between resistors R37 and R38, the latter point having a potential of for example −5 volts. To the latter point on the voltage divider is also connected the cathode 92 of the other diode through resistors R15 and R13. This cathode 92 is also connected to control grid 37 in control tube V3 of the amplifier unit AU1 via a filter chain consisting of resistors R15, R17 and R19 and capacitors C7, C9, C11. The anode 98 of the same diode is connected to the voltage divider at a point between resistors R38 and R39 where the potential is for example −7 volts.

The arrangement works substantially in the following manner.

When the arrangement is at rest, that is when the microphones are not actuated by any appreciable signals, the control grid potentiometers R21 and R22 are so set that a moderate and substantially equal initial gain is obtained in both amplifier units. In the following the initial gain will be considered as zero level. If now sound strikes for example microphone M1, the microphone causes an alternating voltage on grid 7 in the twin triode V1. The alternating voltage is amplified and applied to control grid 25 in control tube V3, is further amplified in the hexode section which to begin with is set to yield said initial gain, and is finally applied to control grid 53 of output tube V5 wherein the alternating voltage is still further amplified, and passed to loudspeaker H1.

At the same time, however, part of the alternating voltage is taken from anode 61 of output tube V5 and applied to control grid 76 in triode section 76, 80, 82 of twin triode V2 in the other amplifier unit AU2 from where it is applied to the diodes in twin diode V8 to be rectified and used as control voltage.

In twin diode V8 the cathode 96 in one diode has a bias of −4 volts, while the anode 90 of the same diode has a bias of −5 volts. Thus, the amplitude of the alternating voltage applied through capacitor C4 must exceed 1 volt in order that rectification shall take place in this diode. If the amplitude of the voltage exceeds 1 volt, rectification occurs, and anode 90 becomes the more negative with respect to ground the larger the alternating voltage applied to anode 90.

Part of this negative control voltage is taken from voltage divider R12, R14 and is applied via a smoothing filter consisting of components R18, R20, C8, C10, C12 to control grid 36 in control tube V4. This causes an increase of the screen grid current through resistor R24 whereby the screen grid voltage is reduced which in turn leads to the result that the mutual conductance of the tube is reduced and its plate resistance is increased so that the amplification of the tube is reduced.

The same alternating voltage which is applied over capacitor C4 to the anode 90 in one diode of V8 is also applied over capacitor C6 to cathode 92 in the other diode. This diode has a higher potential difference between its anode and cathode since cathode 92 is connected to −5 volts and anode 98 to −7 volts. Therefore, rectification does not occur in this diode until the amplitude of the alternating voltage applied to the cathode exceeds 2 volts. Since the alternating voltage is applied to the cathode of this diode, cathode 92 will become the less negative respect to ground the more the alternating voltage exceeds 2 volts.

Cathode 92 is connected to control grids 37 and 35 in the regulating tube V3 in amplifier unit AU1 via a smoothing filter consisting of components R15, R17, R19, C7, C9, C11. When control grid 35 becomes less negative with respect to ground, the screen grid current through resistor R23 is reduced, and the screen grid voltage is increased whereby the mutual conductance of the tube increases and its plate resistance decreases so that the gain of the tube is increased. If the control voltage becomes so strong that control grid 37 will receive zero potential or even become positive with respect to ground, grid current will occur, which limits the control grid voltage and thereby sets a limit for the increase of the gain. Since anode 51 is connected to control grid 37, an increased grid current is obtained resulting in an effective limitation of the maximum value of the gain (so called limiter circuit).

It should be noted that in the illustrated circuit a certain desired delay will be achieved in the restoration of the amplifier units to normal condition, since capacitors C3, C5 and C4, C6 respectively are charged via circuits which have considerably less resistance than the circuits through which they are discharged.

The increase as well as the reduction of the gain takes place according to substantially the same characteristics but the reduction of the gain is always somewhat ahead of the increase of the gain depending on the different values of the control voltages obtained because the diode rectifiers have reversed polarity with different voltages. This will also be seen from FIGURE 2 which shows a diagram of a control process according to the invention.

In the coordinate system, the magnitude of the signal alternating voltage emanating from the microphone in one amplifier unit, for instance AU1, is measured along the X-axis with the lowest value at origin O. The Y-axis indicates in decibels the gain increase of this amplifier unit AU1 from origin O and upwards and the gain decrease of the other amplifier unit AU2 from origin O and downwards. The origin O represents the initial gain of the amplifier units. In this case the initial gain is assumed to be equal in the two amplifier units, though for special installations, as for example where background noise near one microphone is higher than it is near the other microphone, the initial gains of the respective amplifier units may be different.

Figure 2:
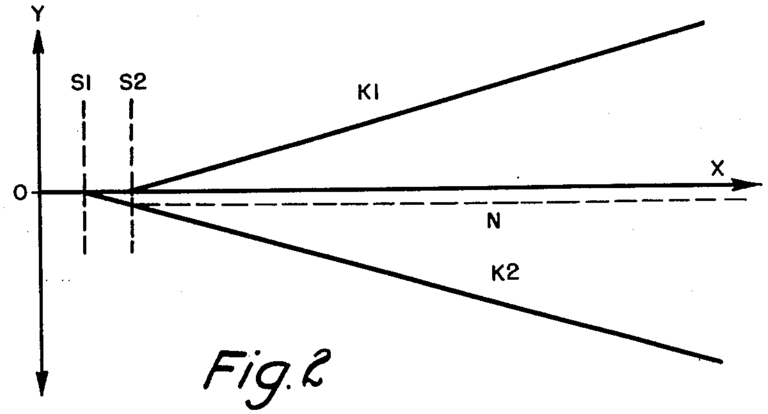
FIGURE 2 is a diagram illustrating the control process in the amplifier according to FIGURE 1.

If a signal arrives at amplifier unit AU1, a signal alternating voltage is obtained, and the corresponding value in the diagram on FIGURE 2 is displaced from origin along the X-axis as this voltage increases.

When the signal voltage has reached the value at dotted line S1, the gain of amplifier unit AU2 begins to decrease along curve K2 and likewise the level of the total gain of the two amplifier units is decreased. The level is decreased until the signal voltage has reached the value S2, when the gain of amplifier unit AU1 begins to increase along the curve K1. Curves K1 and K2 are here assumed to have substantially the same slope, and therefore the resulting level indicated by dotted line N will be constant and independent of the signal strength and the variation of the signal voltage. This resulting level is somewhat lower than the zero reference level.

One important feature of the above described embodiment of the invention is that the increase as well as the decrease of the gain of the controlled amplifiers is effected by means of the same control grid by increasing and decreasing respectively the negative grid potential. This has been made possible by the described bridge arrangement of the diode rectifiers in the control circuits. The principle of this arrangement is shown in FIGURE 3.

Figure 3:
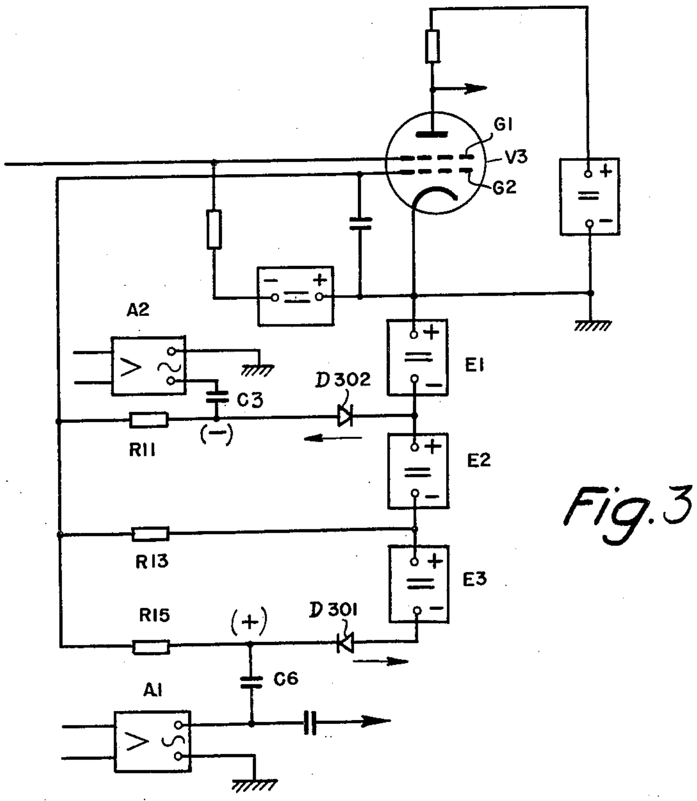
FIGURE 3 is a block diagram illustrating the basic arrangement in one of the amplifier units for providing an increase as well as a reduction of the gain from an initial value by means of one and the same grid in the controlled amplifier stage under simultaneous production of the required threshold values.

FIGURE 3 schematically shows the control circuits for one amplifier unit. All the arrangements shown in FIGURE 3 will be found or have their counterparts in FIGURE 1, and the purpose of FIGURE 3 is only to show more lucidly the said bridge arrangement of the diode rectifiers.

In FIGURE 3, the gain control tube is designated V3. This tube can be of any type suited for the purpose and corresponds to tube V3 or V4 in FIGURE 1. For the sake of simplicity the tube V3 has been shown as containing only two grids, namely the control grid G1 which is supplied with the signal voltage to be amplified, and the control grid G2. The latter grid receives negative bias from voltage sources E1 and E2 over resistor R13 which forms a diagonal branch in the said bridge circuit. The bridge circuit further comprises the diode rectifiers D301 and D302, voltage sources E2 and E3 and resistors R15 and R11. The polarity of the voltage sources and the blocking direction of the rectifiers are indicated in FIGURE 3 by plus and minus signs and by arrows respectively. The voltage sources E2 and E3 correspond to voltage divider resistors R37 and R38 respectively in FIGURE 1 and are common to the control circuits of both amplifier units. If the arrangement according to FIGURE 3 is assumed to constitute the control circuit of amplifier unit AU1 shown in FIGURE 1, then resistors R15, R13 and R11 of FIGURE 3 correspond to resistors R15, R13 and R11 respectively in FIGURE 1, and rectifier diodes D301 and D302 correspond to diode paths 92—98 of V8 and 95—89 of V7 respectively in FIGURE 1.

As will be seen from FIGURE 3, diode rectifier D301 receives bias from voltage source E3 and diode rectifier D302 receives bias from voltage source E2. These bias voltages have such polarities that they strive to drive current in the blocking direction of the respective diode rectifier.

The control alternating voltage taken from the amplifier unit in which tube V3 is included is passed over amplifier A1 and a capacitor C6 to the junction point of diode rectifier D301 and resistor R15. (Assuming that V3 is the same tube as V3 in FIGURE 1, A1 and C6 correspond to the right-hand half of twin triode V2 and capacitor C6 respectively in FIGURE 1.) If the amplitude of this alternating voltage exceeds the fixed negative bias on diode rectifier D301, the alternating voltage is rectified. Rectifier diode D301 is so poled that the rectified voltage opposes the fixed negative bias on control grid G2. This grid then becomes less negative which results in the gain of the tube increasing. When the control alternating voltage taken from the amplifier unit exceeds a certain threshold value determined by the fixed bias on rectifier diode D301, the gain of this amplifier unit will thus be increased.

The control alternating voltage taken from the other amplifier unit is passed over an amplifier A2 and a capacitor C3 to the junction point of diode rectifier D302 and resistor R11. (Assuming that tube V3 is the same in FIGURE 1, A2 and C3 correspond to the right-hand half of twin triode V1 and capacitor C3 respectively in FIGURE 1.) If the amplitude of the last mentioned alternating voltage exceeds the fixed bias on diode rectifier D302, the alternating voltage is rectified. In opposition to diode rectifier D301, diode rectifier D302 is so poled that the rectified voltage is added to the fixed negative bias on grid G2 so that this becomes more negative which results in the gain of the tube being reduced. Thus, when the control alternating voltage taken from the other amplifier unit exceeds a certain threshold value determined by the fixed bias on diode rectifier D302, the gain of the first amplifier unit will be reduced.

The bias voltages on diode rectifiers D301 and D302 are so chosen that the threshold value of that control voltage which effects an increase of the gain, is larger than the threshold value for that control voltage which effects the reduction of the gain, that is, voltage source E3 delivers a higher voltage than voltage source E2.

The invention can of course be varied and modified in many ways without departing from the basic inventive idea. Thus for instance the biased rectifier diodes may consist of non-linear resistors or other non-linear circuit elements.

The invention may also be utilized in amplifiers which are so designed that the decrease of the gain takes place very rapidly and consequently the slope of curve K2 in FIGURE 2 becomes much larger than that of curve K1 in the same figure. It is also contemplated to use the invention in amplifiers speech channels which are controlled to such extent that in rest condition of the amplifiers the gain is zero or approximately zero in the controlled amplifier stages; in such case amplifier stages provided in the signal path ahead of the controlled stages for amplifying the control voltages must instead have a certain initial gain.

*Transistorized Embodiment*

Referring now to FIGURES 4*a* and 4*b*, AU1 and AU2 designate the two amplifier units of a transistorized two-way amplifier embodying the invention. PS in FIGURE 4*b* designated a power supply unit for suppling D.C. power to both amplifier units. The power supply unit PS is connected to an alternating current source, and contains a transformer and rectifiers with filter means of conventional design.

Each amplifier unit is mounted on a separate printed circuit panel board as indicated by the dash-dot lines in the figure. Connections to external circuits and interconnections between the two amplifier units are established by means of terminals which form part of the connectors for attaching the panel boards to the chassis which contains corresponding receptacles for receiving the connectors to provide a common mounting rack or the like. In FIGURES 4*a* and 4*b* these contacts are symbolically indicated by circles on the dash-dot lines and numbered 401 to 412. Terminals 407 and 408 are signal input terminals as from the respective microphones, and terminals 401 and 402 are signal output terminals which may go directly to the respective speakers as indicated in FIGURE 4. The speaker from one amplifier unit in the ordinary installation is mounted adjacent the microphone of the other amplifier unit to thereby provide convenient two-way conversations.

The power supply is connected to terminals 403 and 404. Terminals 409 to 412 are for interconnecting the gain control circuits by which the gain of one amplifier unit is controlled from the other amplifier unit. Terminals 405, 406 and a third terminal which is connected galvanically to terminal 404 are used for connection to a potentiometer 444 which belongs to the respective amplifier unit but is mounted separately so that it is easily accessible for manual operation.

The input signal is applied through input transformer Tr401 to a first amplifying stage comprising transistor T401 and is then amplified in stages comprising transistors T402, T403, T405, T406 and T407. The two latter transistors are connected in push-pull to form the output stage connected to an output transformer Tr404 which has a first secondary winding connected to the signal output terminals 401 and 402.

Transformer Tr404 has a second secondary winding from which part of the signal output energy is taken to transistor T404 where it is amplified. The output voltage from transistor T404 is applied to the primary winding of transformer Tr403. This transformer has two secondary windings, and the output alternating voltages from these windings are rectified in diodes D405 and D406 respectively. Filtering means consisting of resistor R428 and capacitor C410 is associated with diode D405 and similar filtering means consisting of resistor R429 and capacitor C409 is associated with diode D406.

The rectified voltages from diodes D405 and D406 are used as control voltages to control the gain of the amplifier units. The control voltage from diode D405 in each amplifier unit is applied through terminals 411 and 412 and input terminals 409 and 410 of the other amplifier unit to a control circuit in the other amplifier unit to reduce the gain of the latter amplifier unit, whereas the control voltage from diode D406 in each amplifier unit is applied to the control circuit in the same amplifier unit to increase the gain of this amplifier unit. Thus, if speech signals are passing for instance through amplifier unit AU1 the gain of this active amplifier unit will be increased and the gain of inactive amplifier unit AU2 will be reduced in response to the speech currents through active amplifier unit AU1.

In accordance with this embodiment of the present invention control voltage for reducing the gain of the inactive amplifier unit is not produced unless the signal current strength in the active amplifier unit exceeds a first threshold value, and control voltage for increasing the gain of the active amplifier unit should not be produced unless the said signal current strength exceeds a second threshold value which is slightly higher than said first threshold value. These threshold values are obtained by properly biassing diodes D405 and D406. The diodes may be rectifiers of the contact type, and as rectifiers of this type have such a current-to-voltage characteristic that they are practically not conductive even in their forward direction unless the applied voltage exceeds a certain value, they provide a threshold value even in the absence of bias.

For diode D405 which produces control voltage for reducing the gain of the inactive amplifier unit, this threshold value is too high, whereas it is too low for diode D406 which produces control voltage for increasing the gain of the active amplifier. Therefore, a positive bias is applied to diode D405 in each amplifier unit from the power supply over resistors R412 and R407 in the other amplifier unit, and a negative bias is applied to the diode D406 in each amplifier unit from the power supply over resistors R412 and R407 in the same amplifier unit.

The secondary winding of transformer Tr403 which is connected to diode D405 preferably has a larger number of turns than the secondary winding connected to diode D406, so that the voltage applied to diode D405 is always larger than that applied to diode D406. Due to this arrangement and to the said threshold values, the control voltages are given such values that the increase in gain in the active amplifier unit is always less than the simultaneous reduction of the gain in the inactive amplifier unit.

Each amplifier unit comprises an attenuating network connected between transistors T401 and T402. This attenuating network has two shunt branches having impedances which are variable and controlled by the control voltages from diodes D405 and D406. The first shunt branch comprises resistor R413 and the two diodes D401 and D402 each of which is connected in series with a capacitor C405 and C406 respectively to points *e* and *f* common to the input and output sides of the attenuating network. Thus diodes D401 and D402 are effectively connected in parallel with each other in said shunt branch.

Diodes D401 and D402 have a non-linear current-to-voltage characteristic so that the impedance of each diode is reduced with increasing voltage across the diode. These diodes are connected to a voltage divider comprising resistors R411 (which is connected to the positive power lead 404), R412 and R408 which is connected to the negative power supply lead 403. Diodes D401 and D402 thus receive a fixed biassing voltage which drives a current through both diodes defining an initial impedance of the diodes. The biassing voltage may be adjusted to the desired value as by means of the variable resistor R442. It should be noted that with respect to the biassing voltage, diodes D401 and D402 are connected in series and poled in the same direction, as compared with their effective parallel connection discussed in the preceding paragraph.

The control voltage produced by diode D405 in one amplifier unit is applied to the attenuating network in the other amplifier unit over resistors R409 and R410 so that it is added to the fixed bias on diodes D401 and D402. The current through the diodes is thus increased and the impedance of the diodes is thereby reduced which results in an increased attenuating effect of the network and a reduction in the total gain of the amplifier unit.

The control voltage produced by diode D406 in one amplifier unit is applied to the attenuating network in the same amplifier unit over the same resistors R409 and R410. This control voltage has a polarity opposite to that of the fixed bias voltage on diodes D401 and D402 and opposite to the polarity of the bias provided by diode D405 from the other amplifier unit. Therefore, this control voltage causes a reduction of the current through the diodes and an increase in their impedance. Hence the attenuation of the attenuating network is decreased and the total gain of the amplifier unit is increased.

The attenuating network may have a second shunt branch comprising resistor R414 and diodes D403 and D404. These diodes have the same characteristics as diodes D401 and D402 and are connected in the same manner as the latter diodes to the biassing and control circuits.

Resistors R406 and R415 are series arms in the attenuating networks.

The impedances of the shunt branches of the attenuating network can never become less than the resistance values of resistors R413 and R414 respectively, and thus these resistors determine the maximum attenuation of the network. The impedance of the shunt branches reach their maximum values when the control voltage from diode D406 is equal to or exceeds the fixed bias on diodes D401–D402 and D403–D404 so that the diodes are blocked. In this case, the attenuation of the network is at minimum. Thus, there is an upper as well as a lower limit for the gain control.

Capacitors C405, C406, C407 and C408 and resistors R409 and R410 form a low pass filter. Resistor R442 which forms part of the voltage divider for applying bias voltage to the diodes in the shunt branches of the attenuation network, also serves as a discharge resistor for the filter capacitors. The values of this resistor and the associated capacitors are so selected that the gain of the amplifier unit is restored to the initial level with a suitable time delay.

The amplifier stage comprising transistor T402 is of the common collector configuration and therefore presents a relatively high terminating impedance for the attenuating network to give a minimum of attenuation when the diodes D403 and D404 are blocked.

Transistor T401 is connected in the common emitter configuration and has two resistors R404 and R441 in its emitter circuit to provide negative feedback. Resistor R441 is a potentiometer, and a by-pass capacitor C402 is connected between its movable arm and one end terminal, and thus the amount of feedback can be adjusted by means of this potentiometer in order to adjust the initial gain to a predetermined value.

Another potentiometer R444 is connected between transistors T402 and T403 to provide manual volume control. The potentiometers R444 of both amplifier units may be ganged, so that the volume can be changed simultaneously and by equal amounts in both amplifier units.

A negative feedback circuit is connected from one of the secondary windings of output transformer *Tr*402 to transistor T405. This feedback circuit includes a capacitor C418 in shunt with a resistor R434 to cause the amount of feedback to be increased for higher signal frequencies, so that a suitable frequency response characteristic of the amplifier is obtained.

The components of each amplifier unit may be mounted on separate panel boards of insulating material, and the interconnections between the various components consist of printed circuits. The two panel boards in addition to sharing power from a single source, may be interconnected so that a control voltage produced from the audio frequency signals passing through one amplifier unit is applied to reduce the gain of the other amplifier unit.

*Transistorized Embodiment in Loudspeaking Telephone Circuit*

Referring now to FIGURE 5, L designates the connecting terminals for connecting a loudspeaking telephone instrument having a two-way amplifier embodying the present invention into a two-wire telephone line. M and H designate a microphone and a loudspeaker respectively of the subscriber's telephone. HC is a hybrid coil, B is a balance, and SV is a voltage stabilizing and polarity control device which is shown in greater detail in FIGURES 7*a* and 7*b*.

The microphone amplifier includes the following units: a control stage MRS, an output stage MSS, and an amplifier MRF for supplying a control voltage of proper magnitude to rectifier MF. The loudspeaker amplifier includes the following corresponding units: a control stage HRS, an output stage HSS, and an amplifier HRF for supplying a control voltage to rectifier HL. These two amplifying units are in a single telephone instrument at a subscriber's station. Connected to the telephone line L is the usual telephone exchange where other subscribers' stations may be connected to the loudspeaking telephone described below in connection with FIGURES 7*a* and 7*b*. The subscriber's station that is not shown may be either a conventional telephone or another loudspeaking telephone of the type herein described.

Speech or signalling currents incoming from the line to the telephone instrument are applied to the loudspeaker amplifier over hybrid coil HC. Part of the amplifier voice frequency voltage is derived from the output stage HSS of the loudspeaker amplifier and applied to the control voltage amplifier HRF. From this amplifier the voltage is applied to rectifier HL which delivers a first direct control voltage to control stage MRS in the microphone amplifier for reducing the gain of this amplifier. A second direct control voltage is derived from rectifier HL and applied to the control stage HRS in the loudspeaker amplifier to increase the gain of this amplifier. When the incoming speech signal ceases, the control action ceases and the gain of each amplifier is restored to its initial value.

When speech is transmitted from the microphone to the line, a portion of the speech signal voltage is fed from microphone amplifier control stage MRS over amplifier MRF to rectifier MF. From this rectifier a first direct control voltage is applied to the control stage HRS for reducing any signal output from loudspeaker amplifier control stage HRS, and a second direct control voltage is applied to microphone amplifier control stage MRS for increasing the signal amplified by microphone amplifier output stage MSS.

It will be seen that the control circuit extending from each amplifier unit is divided in two branches, the first of which is connected to the amplifier unit from which the control circuit extends, and the other of which is connected to the other amplifier unit. The two branches are so designed that when speech signals are transmitted in the amplifier unit from which the control circuit extends, the gain of this amplifier unit is increased, while the gain in the other amplifier unit is reduced. The two branches are so constituted that the control voltages applied to the amplifiers are of a polarity and magnitude effective to increase the gain of the active amplifier by an amount that is always less than the reduction of gain of the inactive amplifier. This is illustrated by the curves in FIGURE 6, which are similar to the curves in FIGURE 2 particularly in that both sets of curves show that the increase of the gain in one amplifier unit is less than the simultaneous reduction of the gain of the other amplifier unit.

In FIGURE 6 curve K1 represents the gain in the active amplifier, while curve K2 represents the gain in the inactive amplifier, as a function of the speech signal voltage applied to the active amplifier. In the diagram the gain is given in decibels with the initial gain as reference level. The initial gain is assumed to be the same for both amplifiers in that it is an intermediate value which can be increased or decreased.

As will be seen from FIGURES 2 and 6, the control action does not start until the amplitude of the applied signal voltage has reached a certain threshold value. As will be seen from these figures, this threshold value is different for the two amplifiers so that the control action in the active amplifier does not commence until the signal voltage has reached a value which is higher than that for which the control action is commenced in the inactive amplifier. It appears further from FIGURES 2 and 6 that the reduction of the gain of the inactive amplifier is always larger than the increase of the gain of the active amplifier. In accordance with one feature of the invention, this prevents undesired feedback and oscillation inherently present in other amplifiers of this type without noticeable clipping of speech syllables or loss of the first words spoken.

The control circuits include limiting devices which cause the gain in the two amplifiers to become substantially constant when the applied signal voltage exceeds a certain value, that is curves K1 and K2 are running horizontally for signal voltages exceeding said value. This reduces distortion in the system where strong signals are present.

Both in the microphone amplifier and in the loudspeaker amplifier, the control alternating voltage is taken out from points located after the respective control stage. Thus the control action takes place very rapidly and becomes imperceptible to the interconnected subscribers. One circuit embodiment illustrating a typical control circuit designed to provide the control action illustrated in FIGURE 6 will be described in detail with reference to FIGURES 7*a* and 7*b*.

FIGURES 7*a* and 7*b* placed side by side show a complete circuit diagram of a transistorized loudspeaking telephone instrument incorporating a further embodiment of the two-way amplifier of the present invention. In these figures, M designates a microphone, K is a switch intended to be operated upon a call to or from the instrument which functions in a manner similar to the cradle switch of a conventional telephone, FS may be the ordinary circuit interrupter of a dial, SO is a signalling device, SVL is a rectifier bridge, VC a volume control device and H a loudspeaker. The amplifying elements in the two amplifier units consist of transistors.

The units shown schematically in the block diagram in FIGURE 5 are shown in detail in FIGURES 7*a* and 7*b* as appears from the following.

The control stage MRS is formed by the microphone transformer T*r*901 which is connected to a resistance-coupled amplifier stage including transistor T901, diodes D901 and D902, resistor R910, and capacitors C905 and C906 which are connected to the positive power supply line, and a cathode follower amplifying stage with transistor T902. Amplifier MRF of FIGURE 5 which amplifies the speech signals for providing the control voltage consists of amplifying stages T906 and T907 and output transformer T*r*905. Rectifier MF of FIGURE 5 includes diode D906 and capacitor C916 and diode D910 and capacitor C927. Output stage MSS of the microphone amplifier circuit includes transistors T903, T904 and T905, the latter two transistors forming a push-pull amplifying stage, and driver transformer T*r*902.

Referring now to FIGURE 7*b*, transformer T*r*904 is the input transformer of the loudspeaker amplifier. The control stage HRS of FIGURE 5 is formed by diodes D914 and D915, resistor R932, capacitors C923 and C924 connected to the positive power supply terminal, and a cathode follower amplifier stage with transistor T908 of FIGURE 7*b*. The output stage HSS includes transistors T909, T910 and T911, the two latter transistors forming a push-pull amplifier stage, and driver transformer T*r*907, output transformer T*r*908 and volume control VC. Amplifier HRF includes transistor T912 and the output transformer T*r*906. Rectifier HL comprises diode D911, capacitor C930, diode D912 and capacitor C929.

The voltage stabilizing and polarity control device SV comprises rectifier bridge SVL, voltage stabilizing elements D907–D908 and capacitors C919 and C920.

Balance B consists of resistor R927 and capacitor C918 in the secondary circuit of transformer T*r*903 in FIGURE 7*a*, which is the hybrid coil designated as HC in FIGURE 5.

The impedance of the line L as seen from the telephone apparatus may vary considerably. During switching operations at the central office it may even happen that the office end of the line is entirely opened in which case the impedance of the line becomes very high. In order to secure a fairly satisfactory balance at the hybrid coil of the telephone apparatus under all conditions, a circuit consisting of resistor R960 and capacitor C938 is connected between the line conductors.

The signalling device SO consists of a bell, buzzer or the like which may be part of the conventional telephone.

The amplifiers obtain the required operating direct voltage from telephone line L connected to the instrument. When switch K is operated, the D.C. voltage from telephone line L is applied to rectifier bridge SVL input terminal *a* through the D.C. path including winding VII of transformer T*r*903 and winding I of transformer T*r*904 and to input terminal *b* through winding V of tranformer T*r*903 and winding II of transformer T*r*904. The transformer windings serve to separate the speech signals from the direct current which is preferably used to power the transistors in the amplifier units. From the output terminals *c* and *d* of rectifier bridge SVL, the direct voltage is applied to the amplifier.

By use of a full wave rectifier bridge SVL, the polarity of the direct voltage applied to the amplifier circuits will be the same irrespective of the polarity of the voltage on the wires of the telephone line L.

The operating voltage of the amplifiers may be stabilized to a suitable value by a voltage stabilizing device connected across output terminals *c* and *d*. The stabilizing device may consist of a plurality of non-linear elements D907–D908. The value of the direct voltage applied to the subscribers' lines is different for different telephone networks, and the said voltage stabilizing device makes is possible to connect the telephone instrument to any existing telephone network of the approximately proper voltage.

An example of a resistor of this kind is the selenium rectifier which does not pass current even in the forward direction if the voltage across the rectifier does not exceed a certain value. For a single selenium rectifier cell this value is rather small, and in order to obtain a usable non-linear resistor the resistance of which does not decrease at a too low value of the applied voltage, it is necessary to connect an adequate number of selenium cells in series.

Capacitor C919 (FIGURE 7*b*) is connected across output terminals *c* and *d* of rectifier bridge SVL. This capacitor, which is preferably an electrolytic capacitor with a very high capacity, for example 500 microfarads, serves as a storage capacitor and is charged during periods of low excitation of the transistor amplifiers and delivers additional power during periods of full excitation of the amplifiers. This part of the circuit is also described and claimed in my co-pending application Serial No. 705,359, filed December 26, 1957.

If the resistance of the line connected to the telephone instrument is very high, the voltage applied to the amplifiers from the line may be insufficient to permit satisfactory operation of the amplifiers. In such case, a local buffer battery may be provided in the instrument. Such a battery is shown in FIGURE 7*b* and is designated BA. This battery preferably consists of a miniature storage battery, and the telephone instrument is provided with suitable connecting means for facilitating the insertion of this battery in the instrument if required. However, in the case of normal line resistances this battery is unnecessary.

Capacitor C920 is connected between the input terminals of rectifier bridge SVL and serves as a by-pass capacitor for the incoming signal voltage.

Semiconductor diodes D903 and D916 connected to the push-pull output stages of the amplifier units consist of elements which maintain a practically constant voltage within a certain range of operation independent of the intensity of the current flowing through the elements. The base voltage for transistors T904, T905 and T910, T911 is thus maintained constant. Moreover, semiconductor diodes D903 and D916 have a negative temperature coefficient and thus afford an effective voltage and temperature stabilization.

The output stage of the microphone amplifier in FIGURE 7*a* is provided with a device for protecting transistors T904 and T905 against excess voltage which may appear on the line. This part of the circuit is also disclosed and claimed in my co-pending application Serial No. 705,314, filed December 26, 1957. This protective device consists essentially of diodes D904 and D905. As appears from the drawing these diodes have normally a large negative bias (their common juncture being connected to the positive terminal *d* of rectifier bridge SVL and their other terminals being connected through winding I and IV of transformer T*r*903 to the negative terminal *c* of rectifier bridge SVL) and therefore do not load the push-pull amplifier stage consisting of transistors T904 and T905. If an excess voltage arrives from the telephone line L to the instrument, voltages are induced in windings II and IV of transformer Tr903 which will coact with or counteract the negative biases across diodes D904 and D905 according to the polarity of the excess voltage. When the voltages in the said transformer windings have become so large that one of the diodes commences to conduct current, the corresponding transformer winding is short-circuited by the conductive diode whereby the excess voltage is heavily damped so that it cannot cause damage to the transistors. The voltage across the other transformer winding will be added to the negative bias across the diode connected in parallel with this transformer winding, but the resulting voltage cannot assume a value higher than about twice the value of the negative bias on the diode. This is due to the fact that when one of the transformer windings II and IV is shortcircuited, the voltage across the transformer windings connected to the line will be heavily damped.

The control circuits for the automatic control of the gain of the amplifiers in the loudspeaking telephone of FIGURE 7 in response to the transmitted speech signal voltages are described below. These control circuits are similar in operation to the control circuits described above in connection with the two-way amplifier of FIGURE 4. Certain detailed subcombinations in the gain control circuits are claimed in my co-pending application Serial No. 705,283, filed December 26, 1957, and described in detail in connection with FIGURES 8 and 9.

In the microphone amplifier shown in FIGURE 7*a*, a portion of the speech signal voltage is taken from the emitter of transistor T902 and amplified in transistors T906 and T907 and is applied to the primary winding of transformer Tr905. This transformer has two separate secondary windings II and III, and the output alternating voltages from these windings are rectified in diodes D906 and D910 respectively. Hence direct voltages with the polarities indicated on the drawing will appear across capacitors C916 and C927.

Direct voltage across capacitor C916 is applied to the control stage in the microphone amplifier and causes an increase in the gain of this amplifier in a manner to be described below. The direct voltage across capacitor C927 is applied to the control stage of the loudspeaker amplifier and causes a reduction of the gain of the loudspeaker amplifier. The winding III of transformer Tr905 has a larger number of turns than winding II of the same transformer, and therefore the direct voltage across capacitor C927 will become larger than the direct voltage across capacitor C916 which results in the reduction of the gain of the loudspeaker amplifier commencing before and always being larger than the increase of the gain of the microphone amplifier.

Diode D906 receives a negative bias through the resistors R907 and R915. A corresponding bias is applied to diode D910 through resistors R936 and R940 (see FIGURE 7*b*). Due to this bias, a signal level in the amplifier unit above a threshold value is required before any control voltage is obtained as is apparent from FIGURE 6. In view of a smaller number of turns in secondary winding II than is in secondary winding III of transformer Tr905, the increase in the gain of the microphone amplifier unit commences later in signal strength than the reduction of the gain of a loudspeaker amplifier as shown in FIGURE 6.

The microphone amplifier as well as the loudspeaker amplifier contain attenuation network similar to those provided in the amplifier units of the two-way amplifier shown in FIGURES 4*a*–4*b*. In the loudspeaking telephone illustrated in FIGURES 7*a*–7*b* each of the attenuation networks contains only one shunt branch. In the microphone amplifier this shunt branch comprises resistor R958 and diodes D901 and D902, and in the loudspeaker amplifier it comprises resistor R961 and diodes D914 and D915. However, additional shunt branches may be provided if desired to increase the control range.

The fixed bias on the diodes D901 and D902 in the microphone amplifier is stabilized by means of a stabilizing diode D917, and similarly the fixed bias on diodes D914 and D915 in the loudspeaker amplifier is stabilized by means of a stabilizing diode D918. This stabilization serves to secure a constant initial gain.

The gain of the microphone amplifier unit is determined by the current flowing through diodes D901 and D902. The admittance between points *e* and *f* is reduced when the current flow through diodes D901 and D902 is decreased which results in an increase of the gain. Conversely when the admittance is increased, the gain is reduced. Diodes D901 and D902 have a non-linear characteristic so that the resistance is decreased with increasing current through them. Diodes D901 and D902 are connected to be poled in the same direction and are connected across the power supply to be biased through resistors R914 and R906 to an intermediate value, and the current produced by this bias through the diodes determines the initial gain of the amplifier. The voltage across capacitor C916 is of opposite polarity to this bias and thus causes a reduction of the current through the diodes so that their resistance is increased when the gain in the microphone amplifier unit is increased. Since with regard to alternating voltage, the diodes are connected through capacitors C905 and C906 to the positive power supply line and in parallel to the input of the control stage transistor T902, this results in an increase of the gain of the microphone amplifier.

Capacitors C905, C906, C907 and C908 and resistors R908 and R909 form a low pass filter. Resistor R910 is connected in parallel with diodes D901 and D902 and serves as a discharge resistor for the filter capacitors. This resistor and the associated capacitors are so dimensioned that the gain is restored to the initial level with a suitable time delay for purposes of a two-way conversation.

Resistor R910 and the corresponding resistor R932 in the loudspeaker amplifier are preferably of the type that has a negative temperature coefficient so that they contribute to the temperature stabilization of the respective amplifiers. Alternatively, they may consist of an ordinary resistor connected in series with a resistor R910A and R932A respectively which has a negative temperature coefficient.

Further temperature stabilization of the amplifiers at very high and very low temperatures is effected by means of resistors R912A and R918A in the microphone amplifier, and resistor R942A in the loudspeaker amplifier. These resistors have a negative temperature coefficient and stabilize the D.C. operating points for transistors T902, T903, T906 and T907 in the microphone amplifier and transistors T908 and T909 in the loudspeaker amplifier.

Referring now to FIGURE 7*b*, in the loudspeaker amplifier unit diodes D914 and D915 perform the same function as diodes D901 and D902 in the microphone amplifier unit of FIGURE 7*a*. Diodes D914 and D915 receive bias through resistors R941 and R933. The direct voltage across the capacitor C927 from secondary winding III of transformer Tr905 (FIGURE 7*a*) is added to this bias to further increase the current in diodes D914 and D915 whereby the gain in the loudspeaker amplifier unit is reduced.

When the signal currents are in the loudspeaker amplifier unit of FIGURE 7*b*, a portion of the signal voltage is taken from the output transformer Tr908 through capacitor C936 and amplified in transistor T912 and is then applied to the primary winding of transformer Tr906. The circuits connected to the two secondary windings of this transformer containing diode D912 and capacitor C929 and diode D911 and capacitor C930 are designed and arranged in a similar manner as the corresponding circuits connected to the secondary windings of transformer *Tr*905 in the microphone amplifier unit of FIGURE 7*a*. Thus when speech signals are passing through the loudspeaker amplifier unit, the increase in gain of the loudspeaker amplifier unit is effected by the control voltage from a secondary winding II of transformer *Tr*906 causing a decrease in current conduction in diodes D914 and D915 while the decrease in gain of the microphone amplifier unit is effected by the control voltage from secondary winding III of transformer *Tr*906 causing an increase in the current conduction in diodes D901 and D902.

In the loudspeaker amplifier unit the control voltage is taken from the output stage of the amplifier unit which is advantageous because in such case the control alternating voltage does not require any large amplification before it is rectified. Therefore there is only one transistor T912 in the control voltage amplifier stage of the loudspeaker amplifier. In the microphone amplifier the control alternating voltage cannot be taken from the output stage because in such case signal voltages incoming from the line would pass to the control voltage amplifier stage of the microphone amplifier and thereby cause a control action counteracting the desired control action. This is the reason why the control voltage in the microphone amplifier is taken from one of the first amplifier stages.

The amplifier stages for amplifying the alternating control voltage in both amplifiers are so designed that they cause an amplitude limitation so that the increase and reduction respectively of the gain in the amplifiers becomes constant when the amplitude of the signal voltage exceeds a predetermined value.

As appears from FIGURE 7*a*, the output stage of the microphone amplifier has a negative feedback, and the microphone amplifier therefore has, in addition, a low output impedance.

The output transformer Tr8 of the loudspeaker amplifier has a secondary winding I from which a negative feedback voltage is taken to the preceding amplifier stage T909. From the other secondary winding II of transformer *Tr*908 an alternating voltage is taken which is applied to diode D913. When the amplifier is operating with nearly maximum excitation, this voltage is rectified in diode D913 so that a direct voltage with the polarity indicated in the figure is obtained across capacitor C928. This direct voltage strives to increase the current through diodes D914 and D915 and thereby reduce the gain so that overexcitation is prevented.

In the embodiment disclosed in FIGURES 7*a* and 7*b*, the desired relation between the characteristics for gain increase and gain reduction is obtained by suitable dimensioning of the windings on transformers *Tr*905 and *Tr*906 and by properly biasing diodes D906 and D912. However, the said relation can also be obtained in other ways, as for example by choosing diodes D906, D910, D911 and D912 to have different current-voltage characteristics.

The various components of the amplifiers of the loudspeaking telephone illustrated in FIGURES 7*a* and 7*b* may be mounted on one side of a chassis plate of insulating material. The interconnections between the components may be printed circuits on the other side of the plate. The plate may be mounted in a housing which also contains the microphone and the loudspeaker. The microphone is connected to the terminals marked M on the chassis plate and the loudspeaker is connected to the terminals marked H. The line is connected to the terminals marked L.

To more fully explain the operation of the control circuits shown in the transistorized two-way amplifiers described in connection with FIGURE 7 and FIGURE 4, reference is made to FIGURE 8. In FIGURE 8, G designates an alternating current generator having an internal impedance $Z_g$. A load impedance Z is connected to the output of generator G in series with two condensers C1 and C2. D1 and D2 are non-linear elements preferably consisting of rectifier diodes. Each of the diodes D1 and D2 is connected in series with condensers C3 and C4 respectively, and the two series combinations of a diode and a condenser are connected in parallel across the output circuit of the generator. A direct current source E is connected to supply a D.C. bias to the two diodes D1 and D2 in series. The diodes are poled in the same direction in the D.C. circuit so that the biassing voltage drives current through both diodes.

Diodes D1 and D2 have equal characteristics, and the voltage of the direct current source will be equally distributed across the diodes so that the bias on each diode will be half the voltage of the direct current source as long as no alternating voltage is applied to the diodes from the generator G. When the generator is operating there will be an alternating voltage superimposed on the D.C. bias across the diodes, and it will be realized that when the resultant voltage across one diode is equal to the sum of the D.C. bias and the instantaneous value of the alternating voltage, the voltage across the other diode is equal to the difference between the D.C. bias and the instantaneous value of the alternating voltage.

Diodes D1 and D2 have a current-to-voltage characteristic in their forward direction defined by the formula $$I=kE^n$$

where I is the current through the diode, E the voltage across the diode, and $k$ and $n$ are constants.

Assuming now that the impedance Z is very high so that the current through it can be neglected, and that the condensers C1, C2, C3 and C4 have such large capacities that they offer negligible impedance to the alternating current, the output current from the generator G will be $$i=k(V+e)^n-k(V-e)^n$$

where $i$ is the instantaneous value of the output current from the generator, V is the D.C. bias produced across each diode by the direct current source E, $e$ is the instantaneous value of the alternating voltage produced by generator G across the output circuit, and $k$ and $n$ are the constants mentioned above. This formula applies as long as $e$ is less than V so that no rectification occurs in the diodes.

It will be seen that if $n$ is larger than one, which means that the current through the diodes is a non-linear function of the voltage, the current $i$ will be dependent on the D.C. bias V across the diodes. If $n=2$, the current $i$ will be equal to $4kVe$, so that in this case the resultant admittance presented by the two diodes to the alternating current is a linear function of the bias V but is independent of $e$. If $n$ is larger than 2, this admittance will be dependent not only on V but also on $e$ which means that the wave-shape of the output voltage will no longer be the same as that of the electromotive force generated in the generator G, or in other words, distortion occurs. However, if $e$ is small as compared with V, this distortion is negligible, and diodes having a value of $n$ larger than 2 have been used to advantage in practical embodiments of the invention described above.

If G and $Z_g$ represent an amplifying stage in an amplifier and Z represents another stage in the same amplifier, the total gain of the amplifier may be varied by varying the voltage of the direct current source E. This voltage may be composed of a steady component supplied for instance by the source delivering D.C. operating power for the amplifier and a component derived from the alternating current signal passed through the amplifier and varying in accordance with the strength of this signal, whereby the gain of the amplifier is automatically controlled. The said steady voltage determines the initial gain of the amplifier, that is the gain when no signal is passing through the amplifier. The variable voltage component can be applied so that the gain of the amplifier is either increased or reduced with increasing signal strength.

FIGURE 9 illustrates the part of the two-way loudspeaking telephone described above in connection with FIGURE 7 which serves as the control circuit for automatically controlling the gain of two amplifiers, one amplifier being provided for each direction of transmission. The amplifiers which are not shown in the figure, may be of any suitable design such for example as those shown in FIGURES 7 and 4.

The control circuit of one amplifier, hereinafter referred to as the first amplifier, comprises diodes D9 and D10, while the control circuit of the second amplifier comprises diodes D7 and D8.

Both amplifiers are provided with means of known kind for deriving from some stage of the amplifier an alternating voltage varying in accordance with the signals through the respective amplifier. This voltage, hereinafter referred to as the control voltage, is rectified to produce a D.C. voltage varying in accordance with the audio frequency signal strength, and the rectified control voltage is applied to the control circuits to effect a regulation of the gain of the amplifiers in a manner to be described in the following.

The control voltage from the first amplifier is applied to the primary winding of transformer T1, while the control voltage derived from the second amplifier is applied to transformer T2. Each of transformers T1 and T2 has two separate secondary windings designated I and II. Rectifiers D3, D4, D5 and D6 are connected to the secondary windings of the transformers to rectify the alternating voltage appearing across the respective windings. The rectifier associated with winding I on each transformer is connected to the control circuit of that amplifier which supplies control voltage to the primary winding of the transformer, while the rectifier associated with winding II on each transformer is connected to the control circuit of the other amplifier. Thus the output circuit of the rectifier associated with winding I of one transformer is connected in parallel with the output circuit of the rectifier associated with winding II of the other transformer.

Diodes D9 and D10 of the control circuit of the first amplifiers are biassed from a suitable direct current source through resistors R13 and R17. This bias drives a direct current through the diodes defining the operating point on the current-to-voltage characteristic of the diodes. Terminals *a* and *b* are connected to the input of an amplifying stage in the amplifier, and the admittance between these terminals controls the gain of the amplifier. The bias on the diodes D9 and D10 determines the initial admittance between terminals *a* and *b* and hence the initial gain of the amplifier.

Condensers C15 and C16 together with resistors R14 and R16 and condensers C13 and C14 form a low-pass filter for preventing any remaining high frequency component in the rectified control voltage from being applied to diodes D9 and D10. The resistor R18 serves as discharge resistor for condensers C15 and C16 and its resistance is so chosen that when the control voltage ceases, the gain is restored to its initial value with a suitable time delay.

The control circuit is perfectly balanced with respect to terminals *a* and *b*, and variations in the D.C. voltage applied to the diodes do not cause any variation of the polarity of terminal *a* with respect to terminal *b*.

The control circuit of the second amplifier including diodes D7 and D8 is of the same design as the control circuit of the first amplifier. Terminals *c* and *d* are connected to an amplifying stage in the second amplifier.

The rectifiers D5 and D3 are biassed through resistors R12 and R15, so that rectifier D5 obtains a negative bias and rectifier D3 a positive bias. Rectifier D4 and D6 are similarly biassed through resistors R7 and R6.

It will now be assumed that signals, for instance speech signals, are passing through the first amplifier. An alternating control voltage varying in accordance with the signals is then applied to the primary winding of transformer T1. The voltage induced in secondary winding I of transformer T1 is rectified by the rectifier D5. The rectified voltage appears across the filter condenser C10 with the polarity indicated on the figure. The resistors R11 and R10 form a voltage divider for the rectified voltage, and from points *r* and *s* on this voltage divider the rectified voltage is applied through the low-pass filter to the diodes D9 and D10 in the control circuit of the first amplifier. This voltage is applied with such polarity that it counteracts the bias supplied through resistors R13 and R17, and hence the admittance between points *a* and *b* will be reduced which results in an increase of the gain of the first amplifier.

At the same time the alternating voltage induced in secondary winding II of transformer T1 is rectified by rectifier D6, and the rectified voltage appears across filter condenser C9 with the polarity indicated on the figure. From points *t* and *u* on the voltage divider formed by resistors R8 and R9 this voltage is applied through the low-pass filter to the diodes D7 and D8 in the control circuit of the second amplifier. The voltage is applied to the diodes with such polarity that it is added to the bias supplied to the diodes through resistors R4 and R5, and hence the admittance between points *c* and *d* will be increased which results in a reduction of the gain of the second amplifier.

When signals are passing through the second amplifier, the control voltage derived from this amplifier is applied to the primary winding of transformer T2. The voltages induced in the secondary windings I and II of this transformer are rectified by rectifiers D4 and D3 respectively, and the rectified control voltages are applied to the control circuits of the respective amplifiers in a manner analogous to that described above. However, in this case the control voltages are applied with such polarities that the gain of the second amplifier is increased while the gain of the first amplifier is reduced.

As mentioned above the rectifiers D3, D4, D5 and D6 have a D.C. bias. Therefore the rectifiers will not produce any output direct current unless the alternating voltage applied thereto exceeds a predetermined value. Consequently the control action does not commence until the signal level in the active amplifier exceeds a predetermined level. Moreover, the windings II of the transformers T1 and T2 have a larger number of turns than windings I, so that for any voltage applied to the primary winding the voltage induced in winding II will always be larger than that induced in winding I. Thus the rectifier associated with winding II will commence producing D.C. output earlier than the rectifier associated with winding I. Hence it follows that the control action in the inactive amplifier commences earlier than the control action in the active amplifier.

The arrangement shown in FIGURE 8 has proved particularly advantageous for controlling the gain of speech amplifiers in systems where self-oscillations are likely to occur. In communication or telephone circuits interconnecting two subscribers, at the subscribers' stations sound energy is inherently transferred from the loudspeaker to the microphone so that a signal may be repeatedly transmitted backwards and forwards in the communication circuit causing howling in the loudspeakers at the subscribers' stations. This effect can be wholly eliminated by means of the control circuit arrangement shown in FIGURE 8, and at the same time the arrangement permits a rather high initial gain in the amplifiers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a two-way amplifier having two amplifier units, one for each direction of transmission, and each amplifier unit comprising at least one stage having variable gain, means connecting said amplifier units to have a moderate initial gain, each amplifier unit having operatively associated therewith means for deriving a first control voltage from signal currents passed through the respective amplifier unit when the strength of the signal currents exceeds a predetermined threshold value, means for deriving a second control voltage from the signal currents passed through the respective amplifier unit, means for applying said first control voltage to the respective amplifier unit to increase its gain, means for applying said second control voltage to the other amplifier unit to reduce its gain, and means for controlling the magnitude of said first control voltage to cause the increase of the gain in one amplifier unit to be less than the simultaneous reduction of the gain of the other amplifier unit.

2. The two-way amplifier as defined in claim 1 wherein said means for deriving the first and second control voltages comprises a transformer having first and second secondary windings, and a separate circuit containing rectifier means for each of said secondary windings for providing direct current control voltages responsive to the amplitude of signal currents in the amplifier unit producing the control voltage.

3. The two-way amplifier as defined in claim 2 wherein the first and second secondary windings have a different number of turns whereby the magnitude of the first control voltage is less than the magnitude of the second control voltage.

4. In a two-way amplifier having two amplifier units, one for each direction of transmission, and each amplifier unit comprising at least one stage having variable gain, means for adjusting the gain of said amplifier units to have a moderate initial gain insufficient to cause oscillations, a control circuit operatively associated with each amplifier unit, said control circuit having a first branch and a second branch, said first branch being connected to an amplifying stage having variable gain in one amplifier unit, said second branch being connected to an amplifying stage having variable gain in the other amplifier unit, said first branch including means for deriving a first control voltage from the signal currents in said one amplifier unit when the strength of said signal currents exceeds a first threshold value, said second branch including means for deriving a second control voltage from the signal currents in said one amplifier unit when the strength of said signal currents exceeds a second threshold value which is lower than said first threshold value.

5. The two-way amplifier as defined in claim 4 wherein said amplifier units each contain transistor amplifier stages and said control circuit associated with each amplifier unit contains a further transistor having in its output circuit a transformer having a first secondary winding in said first branch and a second secondary winding in said second branch, said second secondary winding containing a larger number of turns than said first secondary winding contains.

6. A two-way amplifier having two amplifier units, one for each direction of transmission, each amplifying unit comprising at least one amplifying stage having variable gain, means connecting said amplifier units to have a moderate initial gain, each amplifier unit having associated therewith a control circuit extending from a point in the signal path of the amplifier unit located after the stage having variable gain, said control circuit having a first branch and a second branch, said first branch being connected to an amplifying stage having variable gain in one amplifier unit, said second branch being connected to an amplifying stage having variable gain in the other amplifier unit, said first branch including means for deriving a first control voltage from signal currents in said one amplifier unit when the strength of said signal currents exceeds a first threshold value, and said second branch including means for deriving a second control voltage from the signal currents in said one amplifier unit when the strength of said signal currents exceeds a second threshold value which is lower than said first threshold value.

7. In a two-way amplifier having two amplifier units, one for each direction of transmission, and each amplifier unit comprising at least one amplifying stage having a variable gain, means connecting said amplifier units to have an initial gain of an intermediate amount insufficient to cause oscillations, a first circuit including a non-linear conducting device and capacitance means connected to said one amplifier unit to receive signal energy from said one amplifier unit for producing a first control voltage, a second circuit including a non-linear conducting device and capacitance means connected to said one amplifier unit to receive signal energy from said one amplifier unit to produce a second control voltage, means for applying a substantially constant biasing voltage to each of said first and said second circuits, means for connecting said first control voltage to control the variable gain of said one amplifier unit, means for connecting said second control voltage to control the variable gain of said other amplifier unit, said second control voltage being effective to decrease the gain of said other amplifier unit by an amount which at all times is greater than the effective increase in gain of said one amplifier unit from said first control voltage whereby the total gain of the two amplifier units combined at any time does not exceed the combined initial gain of said amplifier units.

8. The two-way amplifier as defined in claim 7 wherein the biasing voltage in said first circuit is larger than the biasing voltage in said second circuit and the biasing voltage in each circuit is connected to require the signal voltage to exceed a predetermined threshold value before any control voltage is produced by said non-linear conducting device and capacitance means.

9. The two-way amplifier as defined in claim 7 wherein said first and second circuits further include first and second secondary windings of a transformer whose primary winding is supplied with the signal energy for producing the control voltage, and said first and second secondary windings contain differing numbers of turns to decrease the gain of said other amplifier unit by an amount which at all times is greater than the effective increase in gain of said one amplifier unit.

10. A two-way amplifier having two amplifier units, one for each direction of transmission, each amplifier unit comprising at least one amplifying stage having a variable gain, means connecting said amplifier units to have an initial gain, and each amplifier unit comprising, a first means for rectifying part of the signal energy from one amplifier unit and applying the rectified voltage to said one amplifier unit to increase its gain, second means for rectifying part of the signal energy from said one amplifier unit and applying the rectified voltage to the other amplifier unit to reduce its gain by an amount exceeding the amount of the increase in gain in said one amplifier unit, means for applying a first biasing voltage to said first rectifying means, and means for applying a second biasing voltage to said second rectifying means, said first biasing voltage being larger than said second biasing voltage.

11. A two-way amplifier having two amplifier units, one for each direction of transmission, each amplifier unit comprising an amplifying stage having variable gain and a variable impedance network both for controlling the overall gain of the amplifier unit, means for applying a fixed bias to said variable impedance network to determine the initial gain of the stage, each amplifier unit further comprising means for deriving control voltages from audio frequency signal currents through the amplifier unit, said means including a circuit extending from a point in the amplifier unit located after the stage having variable gain and having a first branch and a second branch, said first branch including a rectifier connected to apply a rectified control voltage in addition to the fixed bias to the variable impedance network in one amplifier unit, said rectified control voltage having a polarity causing an increase of the gain in said one amplifier unit, said second branch including a rectifier connected to apply a rectified control voltage in addition to the fixed bias to the variable impedance network in the other amplifier unit, the rectified control voltage in said second branch being of a polarity to cause a decrease of the gain in said other amplifier unit, the increase of gain effected in said one amplifier unit being less than the decrease in gain effected in the other amplifier unit.

12. The two-way amplifier as claimed in claim 11 wherein the variable impedance network contains capacitors connected to rectifiers to be charged and discharged through different circuits, the magnitude of the charge being determined by the rectified voltages, the circuits through which the capacitors are charged having less resistance than the circuits through which they are discharged.

13. A two-way amplifier having a first amplifier unit for the transmission of signals in one direction and a second amplifier unit for the transmission of signals in the opposite direction, said amplifiers being substantially identical; each amplifier unit comprising an electronic tube having variable gain; the cathodes of said tubes being connected to one end of a voltage divider; each of said tubes having a control grid to which are connected: a first circuit comprising a resistor in series with a rectifier connected to a first point on said voltage divider, the rectifier having its forward direction from the control grid to said first point on the voltage divider, a second circuit comprising a resistor connected to second point on said voltage divider, and a third circuit comprising a resistor in series with a rectifier connected to a third point on said voltage divider, the last mentioned rectifier having its forward direction from said third point on the voltage divider to said control grid; said first, second and third points on the voltage divider having increasingly more negative potentials with respect to that end of the voltage divider which is connected to the cathodes of the said tubes; a first capacitor having one terminal connected to a point between the resistor and the rectifier in each of said first circuits, means for applying an alternating voltage derived from the signal currents in one amplifier unit to the other terminal of said first capacitor in the other amplifier unit, a second capacitor having one terminal connected to a point between the resistor and the rectifier in each of said third circuits, means for applying an alternating voltage derived from the signal currents in said one amplifier unit to the other terminal of said second capacitor in said one amplifier unit.

14. The two-way amplifier as claimed in claim 13 further including a filter between said control grid and said first, second and third circuits.

15. The two-way amplifier as claimed in claim 13 further including a first amplifying tube for amplifying alternating voltage derived from the signal currents in said one amplifier unit and a second amplifying tube for amplifying alternating voltage derived from the signal currents in the other amplifier unit, means connecting the output of said first amplifying tube by one of said first capacitors to the one of said first circuits which is connected to the control grid of the gain control tube of the second amplifier unit, means connecting the output of said first amplifying tube by one of said second capacitors to the one of said third circuits which is connected to the control grid of the gain control tube of the first amplifier unit, means connecting the output of said second amplifying tube by the other of said first capacitors to the one of said first circuits which is connectesd to the control grid of the gain control tube of the first amplifier unit, and means connecting the output of said second amplifier tube by the other of said second capacitors to the one of said third circuits which is connected to the control grid of the gain control tube in the second amplifier unit.

16. The two-way amplifier as claimed in claim 13 in which the said control grids of the tubes having variable gain are screen grids and said tubes are of the type having a gain varying with the screen grid voltage.

17. In a two-way amplifier having two amplifier units, one for each direction of transmission, and each amplifier unit having at least one stage containing a variable attenuation network for varying the gain of said amplifier unit, means connecting said amplifier units to have a moderate initial gain, separate circuit means associated with each amplifier unit for deriving amplifier control voltages for both amplifier units from audio frequency signals passed through the variable attenuation network of either amplifier unit when the strength of said signals exceeds a predetermined threshold value including a transformer having a primary winding and two secondary windings one of said secondary windings having a larger number of turns than the other of said secondary windings, means for connecting the secondary winding having the larger number of turns of the transformer in one amplifier unit to the variable attenuation network of the other amplifier unit, means for connecting the secondary winding having the smaller number of turns of the transformer in said one amplifier unit to the variable attenuation network in said one amplifier unit, the increase in gain measured in decibels in said one amplifier unit being less than the simultaneous decrease in gain of the other amplifier unit.

18. The two-way amplifier as defined in claim 17 wherein the variable attenuation network comprises a first and second terminal, a first rectifier and first condenser connected in series between said terminals, said first rectifier having its cathode connected to said first terminal, a second rectifier and a second condenser connected in series between said terminals, said second rectifier having its anode connected to said first terminal, a direct current source connected between the junction of said first rectifier and said first condenser and the junction of said second rectifier and said second condenser, said direct current source being poled to drive current in the forward direction of the two rectifiers, and means for applying the voltage from one of said secondary windings in series with the voltage from said direct current source to said rectifiers to vary the gain of the amplifier unit.

19. The control circuit as defined in claim 18 in which said rectifiers are of the type having such a current-to-voltage characteristic in the forward direction wherein the current through the rectifier is substantially proportional to the square of the voltage across the rectifier.

20. In a two-way amplifier having two amplifier units each having a microphone and loudspeaker, the microphone for one unit being physically located near the speaker for the other unit, said amplifier units being composed of electrical circuit components, the components for each amplifier unit being mounted on separate circuit panel boards; means on each panel board for providing a control voltage in response to the audio frequency signal amplitude in the amplifier unit on the respective panel board; circuit connections between said panel boards for connecting the control voltage producing means on each panel board to reduce the gain of the amplifier unit on the other panel board; and circuit means on each panel board for connecting the control voltage producing means on each panel board to increase the gain of the amplifier unit on the same panel board, the decrease in the gain of the amplifier unit on the other panel board being at all times greater than the increase in gain of the amplifier unit on the same panel board.

21. In a two-way amplifier having two amplifier units each having a microphone and a loudspeaker, the microphone for one unit being physically located near the speaker for the other unit, said amplifier units being composed of electrical circuit components, the components for each amplifier unit being mounted on separate circuit panel boards; a power supply; terminals on said panel boards connecting each amplifier unit to said power supply; means including a pair of variable resistors at a position remote from the panel boards connected to terminals on said panel boards for adjusting the gain of each amplifier unit; means on each panel board for producing a control voltage in response to the audio frequency signal amplitude in the amplifier unit on the respective panel board; circuit connections between said panel boards for connecting the control voltage producing means on each panel board to reduce the gain of the amplifier unit on the other panel board; and circuit means on each panel board for connecting the control voltage producing means on each panel board to increase the gain of the amplifier unit on the same panel board, the decrease in the gain of the amplifier unit on the other panel board being at all times greater than the increase in gain of the amplifier unit on the same panel board.

22. In a two-way amplifier having two variable gain amplifier units providing separate signal paths for audio frequency signals passing in opposite directions, means in each amplifier unit responsive to audio frequency signals passing through the respective amplifier unit for producing a control voltage for varying the gain of both amplifier units comprising a transformer having a primary winding, and two secondary windings having unequal numbers of turns to thereby produce unequal secondary winding output voltages; means including a resistor, capacitor and unidirectional conducting device connected to each of said secondary windings for converting said output voltages to D.C. control voltages; circuit means for connecting the secondary winding having the larger number of turns in one amplifier unit in parallel with the secondary winding having the smaller number of turns in the other amplifier unit, the connection being such that the D.C. control voltages supplied by the secondary windings from different transformers are of opposite polarity; and means for connecting the D.C. control voltages from the said last mentioned circuit means to control the gain of said amplifier units.

23. In a two-way amplifier having two amplifier units providing separate signal paths for audio frequency signals passing in opposite directions, a variable attenuating network in each amplifier unit for varying the gain of the respective amplifier unit comprising first and second input terminals to a signal amplifying stage; a first diode and capacitor connected between said input terminals with the cathode of the diode connected to one of said input terminals; a second diode and capacitor connected between said input terminals with the anode of the diode connected to the other of said input terminals; a voltage divider network connected between opposite terminals of a D.C. power supply for providing an initial direct current flow through both of said diodes; means in each amplifier unit for producing a D.C. control voltage in response to audio frequency signals passing through the respective amplifier unit; and means for applying said D.C. control voltage to decrease the direct current flow through both of said diodes in the attenuating network of the amplifier unit in which the control voltage is produced and for applying said D.C. control voltage to increase the direct current flow through both diodes in the attenuating network of the other amplifier unit.

24. The two-way amplifier as defined in claim 23 wherein said means for producing a D.C. control voltage comprises a transformer having a primary winding, and two secondary windings having unequal numbers of turns to thereby produce unequal secondary winding output voltages; means including a resistor, capacitor and uni-directional conducting device connected to each of said secondary windings for converting said output voltages to D.C. control voltages; circuit means for connecting the secondary winding having the larger number of turns in one amplifier unit in parallel with the secondary winding having the smaller number of turns in the other amplifier unit, the connection being such that the D.C. control voltages supplied by the secondary windings from different transformers are of opposite polarity.

25. The two-way amplifier as defined in claim 23 wherein a resistor is provided in series circuit relation between said one input terminal and the cathode and anode respectively of the first and second diodes to thereby provide a limit for the minimum to which gain of the amplifier unit may be reduced.

References Cited in the file of this patent

UNITED STATES PATENTS 2,952,006 McCarter ---------------- Sept. 6, 1960